Patented Aug. 6, 1946

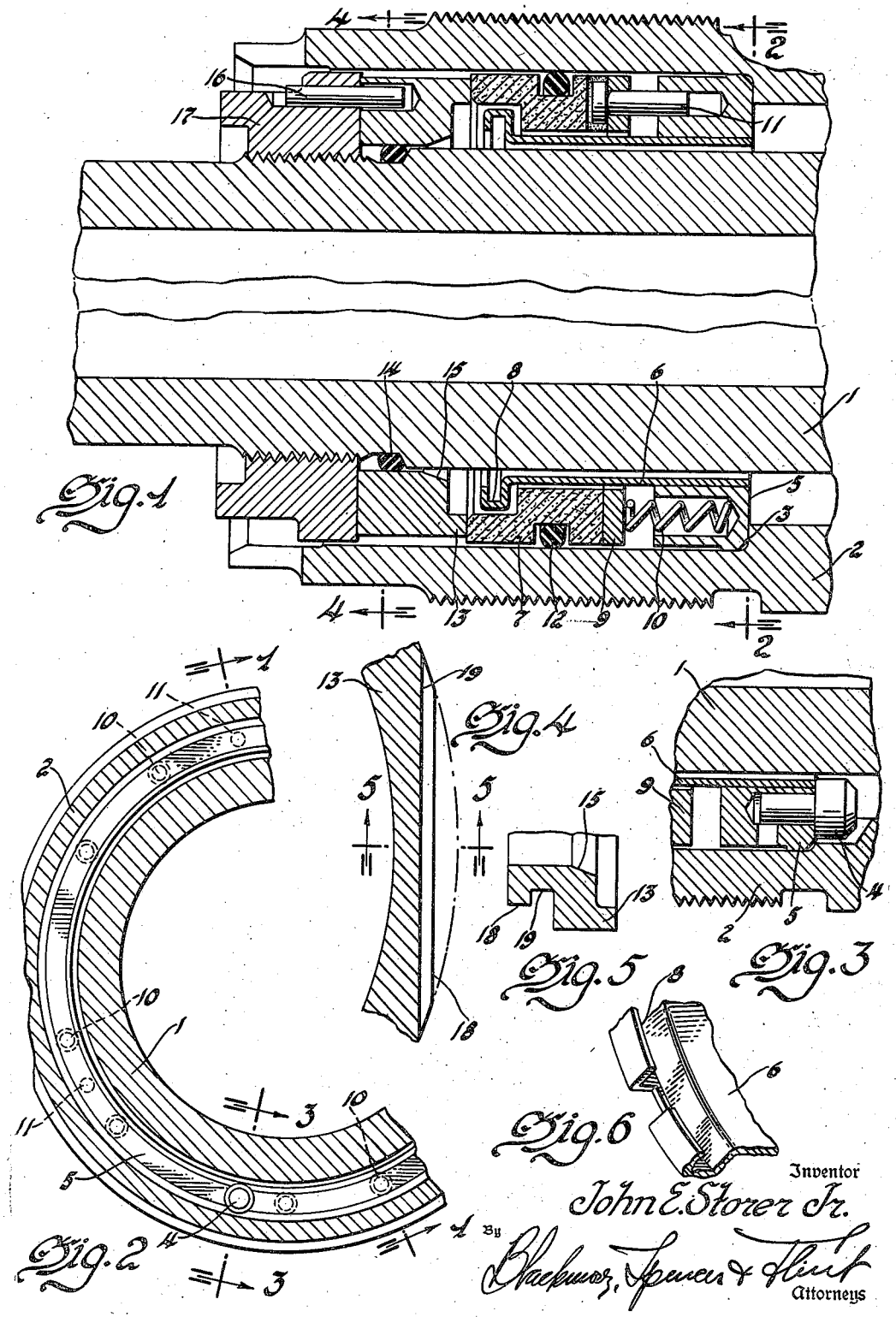

2,405,464

UNITED STATES PATENT OFFICE 2,405,464

SEAL

John E. Storer, Jr., Indianapolis, Ind., assignor to General Motors Corporation, Detroit, Mich., a corporation of Delaware Application January 8, 1945, Serial No. 571,833

4 Claims. (Cl. 286—7)

This invention relates to an improved running fit seal to be located within a pocket between relatively rotatable parts.

An object of the invention is to simplify the construction while providing a low cost dependable seal which can be easily installed or removed for inspection and replacement when necessary.

Further objects of the invention will become apparent during the course of the following specification having reference to the accompanying drawing wherein Figure 1 is a sectional view of a seal installation, and may be considered as having been taken on line 1—1 of Figure 2; Figure 2 is a transverse section taken on line 2—2 of Figure 1 on a reduced scale; Figure 3 is a detail enlarged section on line 3—3 of Figure 2; Figure 4 is a fragmentary section on line 4—4 of Figure 1; Figure 5 is a section on line 5—5 of Figure 4 and Figure 6 is a detail view of a portion of the keeper for the sliding seal ring.

Referring to the drawing the numerals 1 and 2 indicate a pair of relatively rotatable concentric members. For the purpose of disclosure one of the members may be considered as fixed and the other rotatable, or both may be considered as shafts rotatable either in opposite directions or in the same direction at different speeds. Between the members or shafts 1 and 2 and near the end of the outer shaft the intervening space needs to be sealed to protect the usual bearings from exterior foreign matter and retain bearing lubricant. Accordingly a seal receiving pocket is formed by removing material from the interior of the outer shaft 2 for a given distance from its end thereby forming an abutment shoulder at 3. At one point in its circumference the shoulder 3 is cut out axially for a short distance to provide a keyway or narrow internal slot in the wall of the shaft 2 for locating a projecting key 4 on the rear face of a seal mounting ring 5 bottoming on the shoulder 3. For convenience the key 4 is a rounded head on a pin whose shank is fitted to an axially drilled hole in the mounting ring and is secured as a part of a subassembly operation by entering a suitable tool through the intersecting radial opening into contact with the end of the pin and then striking the tool with a hammer blow to throw up or deform the adjacent metal in the pin.

Welded or otherwise secured on the inner surface of the mounting ring 5 is the rear end of a forwardly projecting annular tube or sleeve 6 of sheet metal, which telescopically receives a slidable seal ring 7 of carbon or the like, whose forward face has a rabbeted portion at its internal corner providing an annular groove and a stop shoulder to which is fitted an outturned radial flange or hollow bead 8 at the front end of the sleeve 6 so that the sleeve affords a keeper to retain the sliding seal ring in subassembly relation with the mounting ring 5. The forward flange of the bead 8 is preferably slotted or cut out at diametrically opposite points for the reception of a suitable tool into the hollow bead to facilitate the insertion and removal of the seal subassembly unit. The slots may be so related to the position of the key 4 as to provide a marker for assisting in locating the key in its slot upon axial insertion of the unit into the seal pocket.

Interposetd between the mounting ring 5 and the seal ring 7 is a pressure distributing ring 9 bearing on the rear face of the seal ring and affording a bearing for one end of several circumferentially spaced spreader coil springs 10 whose opposite ends are located within drilled openings or pockets formed in the mounting ring. To key the seal ring to the mounting ring the rear face of the seal ring is formed with a number of circumferentially spaced narrow radial slots, to each of which is fitted a flat sided head of a T-headed pin 11 whose shank projects through aligned openings in the pressure ring 9 and the mounting ring 5 and the opening in the mounting ring is a drilled hole slidably receiving the end of the key pin. A peripheral annular groove or notch is formed in the seal ring 7 to receive a packing ring 12 for closing the space between the relatively nonrotatable seal ring and shaft 2.

The space between the relatively rotatable shaft 1 and the seal ring is closed by a running fit of the lapped face on the nose of the outwardly spring pressed seal ring 7 and a trued complementary face on a second seal ring 13 carried by the shaft 1. The seal ring 13 and its carrying shaft 1 are nonrotatable relative to one another and the space therebetween is closed by a packing ring 14 located within an annular groove conveniently formed on the periphery of the shaft 1 and held under compression between the adjacent shaft and seal ring faces. To keep the packing ring 14 from rolling out of its locating groove during assembly of the parts when the ring 13 is moved axially into the pocket in a direction toward the right in Figure 1, the leading internal edge of the ring 13 is relieved or tapered at 15 so that it tends to wedge or compress the packing as the seal ring moves past.

From its outer face the seal ring 13 has drilled therein one or more axial openings for the reception of a projecting key pin 16 carried by a locating ring or backing nut 17 screw threaded on the shaft 1 at the entrance to the seal pocket and accessible for threading adjustment from the exterior of the pocket. The pin receiving opening in the nut 17 intersects an outer reduced diameter portion so that the end of the pin is exposed and can be staked in place. The periphery of the seal ring 13 near its outer end and at diametrically opposite points has a small flat area 18 with a re-entrant groove 19, with which a suitable hook or puller tool may be engaged for complete removal of the ring 13 from the pockets for convenience of disassembly.

I claim:

1. In combination, a pair of concentric relatively rotatable members having a seal receiving pocket therebetween arranged for axial introduction therein of a succession of ring elements, a locating ring for engagement with an abutment shoulder on one of the members and provided with an end projection to fit a key slot in said shoulder, a seal contact ring spaced axially of the locating ring and provided with annular grooves in its inner and outer peripheral faces, a packing ring located in one of said grooves in sealing contact with said shouldered member, an axially extending retainer sleeve secured at one end to said locating ring and provided at its opposite end with a radial flange extended into the other groove of the seal ring to keep the rings from separation, a pressure ring bearing on the rear of the seal ring, circumferentially spaced springs contained in pockets in the locating ring and bearing on the pressure ring, a series of T-headed pins having their shanks projected through aligned openings in the pressure ring and locating ring and their heads pocketed in radial slots in the back face of the seal ring to key said rings together, a second seal ring having a running face fit with the first seal ring, a packing ring compressed between the second seal ring and the other member, a fastener ring adjustably screw threaded on said other member to set the sealing rings in face to face contact under compression of said springs and a projecting key on the fastener ring engaging within an opening in the second seal ring.

2. In a running fit seal for axial introduction into a pocket between a pair of relatively rotatable parts, a replaceable unit comprising a seal ring having a nose running fit to a companion ring carried by one of the parts, a mounting ring having a key projected from its innermost face for extension into a keyway in the other part, a spreader spring between said rings, a retainer shell fixed at one end to said mounting ring and having an offset at its other end radially overlapping a radial face of the seal ring as a stop abutment therefor to limit outward movement under spreader spring force away from the mounting ring, and a tool engaging formation on said radial offset to facilitate the insertion and removal of said unit and the placement of said key in its keyway.

3. A seal unit including a seal ring having a radial shoulder and a forward nose piece for running contact with a complementary seal surface, said ring on its rear face having a radial key slot, a mounting ring spaced rearwardly of the seal ring, a keeper sleeve telescopically fitted to the seal ring with a radial stop flange at one end to engage said shoulder and fixedly secured at its other end to the mounting ring, a pressure ring between the mounting ring and the seal ring, a spreader spring between the mounting ring and the pressure ring to urge the seal ring outwardly toward engagement with the stop flange of the keeper sleeve and a T-headed pin having its shank slidably fitted to a hole in the mounting ring and projected through an aligned opening of the pressure ring with its head located thereby within the radial key slot in the rear face of the seal ring.

4. In combination, a pair of relatively rotatable members having a seal receiving pocket therebetween, a pair of running fit seal rings in sealing face to face contact within said pocket, means slidably locating the innermost ring in non-rotatable relation to one of the members, a spreader spring urging said ring outwardly, means accessible from outside the pocket in locating attachment to the other member for fixing the outer seal ring thereto and in sealing contact with the inner seal ring under the thrust of said spreader spring and a tool engaging re-entrant seat at the outer end of the outer seal ring to facilitate removal of the outer seal ring from the pocket.

JOHN E. STORER, Jr.